United States Patent [19]

Bongers

[11] Patent Number: 4,601,367

[45] Date of Patent: Jul. 22, 1986

[54] CRASH PROTECTION STRUCTURAL COMPONENT

[75] Inventor: Bernd Bongers, Kirchheim, Fed. Rep. of Germany

[73] Assignee: Messerschmitt-Boelkow-Blohm Gesellschaft mit beschraenkter Haftung, Munich, Fed. Rep. of Germany

[21] Appl. No.: 690,811

[22] Filed: Jan. 10, 1985

Related U.S. Application Data

[63] Continuation of Ser. No. 328,146, Dec. 7, 1981, abandoned.

[30] Foreign Application Priority Data

Dec. 30, 1980 [DE] Fed. Rep. of Germany ....... 3049425

[51] Int. Cl.⁴ ................................................ F16F 7/12
[52] U.S. Cl. ....................................... 188/376; 74/492; 138/DIG. 2; 138/174; 267/149; 280/777; 280/784; 293/133; 297/472
[58] Field of Search ........................ 188/371, 376, 377; 267/148, 149; 280/777, 784, 805; 297/472; 293/122, 133; 74/492; 138/DIG. 2, 174

[56] References Cited

U.S. PATENT DOCUMENTS

| | | | |
|---|---|---|---|
| 3,219,333 | 11/1965 | Derschmitt et al. | 267/149 |
| 3,624,764 | 11/1971 | Goben | 188/377 |
| 4,029,350 | 6/1977 | Goupy | 293/122 X |
| 4,104,095 | 8/1978 | Shaw | 138/DIG. 2 X |
| 4,336,868 | 6/1982 | Wilson et al. | 293/133 X |
| 4,421,202 | 12/1983 | Hoy | 138/124 X |
| 4,465,301 | 8/1984 | Bongers et al. | 280/777 |

FOREIGN PATENT DOCUMENTS

| | | | |
|---|---|---|---|
| 223965 | 1/1959 | Australia | 267/149 |
| 468279 | 11/1928 | Fed. Rep. of Germany . | |
| 2613655 | 10/1977 | Fed. Rep. of Germany | 188/377 |
| 617230 | 11/1926 | France . | |
| 2065832 | 8/1971 | France . | |

OTHER PUBLICATIONS

Schwarz, Glasfaserverstaerkte Kunststoffe, Vogel Verlag Wuerzburg, 1975.
D. V. Rosato, C. S. Grore, Filament Winding, Wiley and Sons, London, 1964.
P. H. Selden, Glasfaserverstaerkte Kunststoffe, Springer, Heidelberg, 1967.

Primary Examiner—George E. A. Halvosa
Attorney, Agent, or Firm—W. G. Fasse; D. H. Kane, Jr.

[57] ABSTRACT

A crash protection structural component is constructed as a hollow sleeve type body which is open at its ends. The hollow body is made of at least one strand of fiber compound material formed into a netting. The netting is constructed for an irreversible stepwise take-up of energy in response to a shock load or impact, whereby the strand layers delaminate at the strand intersections or junctions of the netting as the strand layers are taking up shearing loads in response to a compression load which is applied to the component in the direction of its longitudinal axis.

10 Claims, 9 Drawing Figures

CRASH PROTECTION STRUCTURAL COMPONENT

CROSS-REFERENCE TO RELATED APPLICATION

This application is a file wrapper continuation of copending Ser. No. 328,146; filed Dec. 7, 1981, now abandoned.

BACKGROUND OF THE INVENTION

The present invention relates to a crash protection structural component which is capable to take up energy primarily in a non-reversible manner in response to a compression load applied in the longitudinal axial direction of the crash protection component.

Crash protection components are, for example, needed in the construction of motor vehicles for taking up energy in case of an accidental crash. On the other hand, these components shall also be capable of taking up energy in a reversible manner when the load is relatively small. When the load increases, the energy take-up must be irreversible, at least in such a manner that the energy is not released directly after it has been applied to the protection component.

Such structural components are used, for example, for supporting the front and rear bumper relative to the supporting chassis of the vehicle or relative to the forward ends of the longitudinal carrier beams. Such carrier beams are generally part of the vehicle structure. In case of a crash impact such longitudinal carrier beams must take up a large proportion of the crash energy.

Such energy take-up is determined by the size of the integral $$\int F \cdot ds$$

wherein F is the force applied by the crash and s is the displacement. This integral defines the surface area in a force displacement diagram of such a structural component which is enclosed between the displacement axis, for example, the abscissa, and the force curve. FIG. 1 shows an idealistic force curve as a function of the displacement. This surface area, especially the section thereof representing a high plastic, irreversible, take-up of energy shall be as large as possible. Stated differently, the force shall remain constant as the displacement increases.

Structural components for the purpose of taking up energy in an irreversible manner have been constructed heretofore on the basis of two long established principles. One principle involves hydraulic damping, whereby kinetic impact energy is first converted into friction which in turn is converted to heat, whereby liquids or small spheres are employed, see for example French Patent No. 617,230 or German Patent No. 468,279. The other principle involves the deformation of a metallic material beyond its proportionality limit. The proportionality limit defines the point where the deformation becomes plastic and irreversible as a result of the energy take-up. Such structures are, for example, formed as corrugated tubing or as a carrier beam section in the form of a sheet metal part which starts folding in response to a predetermined compression load.

All prior art structures of this type are subject to substantial disadvantages. One undesirable feature is the relatively large weight of these crash protection components of the prior art, whereby the weight of a vehicle is necessarily increased to an extent that its fuel consumption is also increased and that an increased wear and tear is imposed on road surfaces.

Another disadvantage is seen in the rather costly manufacturing and in the fact that prior art crash protection devices are trouble prone. For example, hydraulic dampers have many trouble-prone elements such as pistons, cylinders, guides, valves, seals and so forth. Failure of any one of these components may reduce or eliminate the effectiveness of the hydraulic damper for its intended purpose.

Structural damping components of metallic materials, particularly steel sheet metal, such as corrugated pipes or folding sheet metals must be manufactured by complicated deep drawing or other deformation processes. Such processes are generally rather energy consuming and involve high temperatures and high pressures for softening or deforming of the material. Another source of failure of this prior type of structure is the corroding of the steel sheet metal.

OBJECTS OF THE INVENTION

In view of the above it is the aim of the invention to achieve the following objects singly or in combination:

to provide a crash protection structural component which is substantially lighter than a comparable prior art component capable of taking up the same energy;

to provide a crash protection structural component which is simpler to manufacture than comparable components of the prior art, and which is less trouble-prone than, for example, comparable corrugated pipes;

to optimize the number of cooperating surface areas which are subject to a shearing load in response to the application of an axial compression crash impact load; and to provide a crash impact protection structural component which is adaptable to use in all those instances where an impact energy must be taken up in an irreversible manner, not only in motor vehicles, but also in aircraft, boats and other instances of irreversible energy take-up.

SUMMARY OF THE INVENTION

According to the invention there is provided a crash impact protection structural component for the substantially irreversible take-up of energy when the component in the form of an open ended hollow body is exposed to a compression load in the direction of its longitudinal axis. The open ended hollow body is constructed as a sleeve type surface in the form of a netting or net work comprising at least one fiber compound material strand. The netting comprises a plurality of strand junctions in which said energy take-up takes place as will be described in more detail below.

The invention achieves the following advantages. Compared to corresponding components of the same size and made of steel, the present components are about four times lighter because fiber compound materials have a specific weight corresponding to about one fourth of that of steel.

The present components may basically be produced by the so-called roving winding technique. In this context, a roving is a bundle of endless fibers which are impregnated with synthetic resin forming a matrix in which the fibers are embedded to form a strand. Reference is made in this connection to the following publications:

"Glass Fiber Reinforced Synthetic Materials" (Glasfaserverstaerkte Kunststoffe) by Schwarz, published by Vogel Verlag; Wuerzburg, 1975;

"Filament Winding" by D. V. Rosato and C. S. Grore, published by Wiley and Sons, London, 1964; and "P. H. Selden, "Glass Fiber Reinforced Synthetic Material" (Glasfaserverstaerkte Kunststoffe) published by Springer Verlag, Heidelberg, 1967.

The roving winding technique has been known for many years and has proven itself very well in practical application. This winding technique is further very well suitable for an automatic operation which is adjustable in any desired manner.

However, heretofore the so-called roving winding technique has been used only for manufacturing completely closed pressure tight hollow bodies having an all enclosing jacket surface. Contrary thereto, according to the invention one or several strands of fiber reinforced compound materials are deposited so as to form a plurality of layers where portions of the same strand or of different strands cross each other to form junctions. In other words, the winding operation according to the invention is performed without any effective progress of revolution whereby an open netting with a stationary or constant pattern is formed.

Another advantage of the invention is seen in that the fiber compound materials are substantially unaffected by corrosion so that failures resulting from this source are practically eliminated. Further, the present components are very adaptable to the required energy take-up by varying the material parameters as well as the structural parameters of the component as will be described in more detail below.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
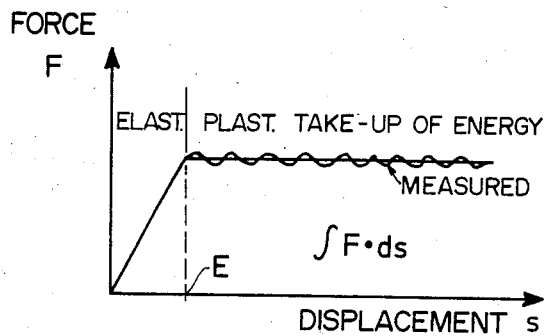
FIG. 1 illustrates an idealized or desirable force displacement diagram for a crash protection structural component.

As mentioned above, FIG. 1 is an idealized force displacement curve of a shock absorber. As long as the displacement does not exceed the point E, the energy take-up takes place in an elastic manner. If the displacement is beyond point E the energy take-up is in a plastic, irreversible manner.

Figure 2:
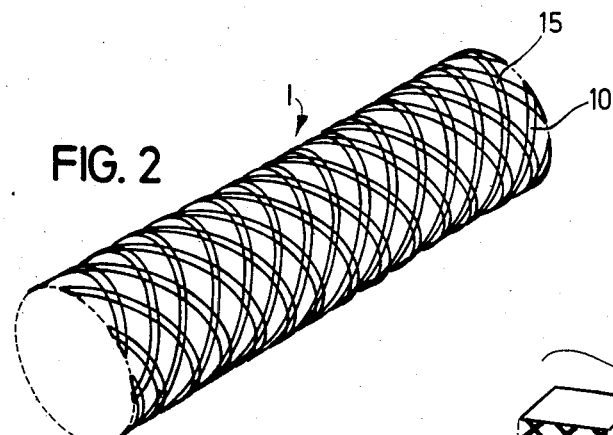
FIG. 2 illustrates a perspective view of a cylindrical crash protection structural component according to the invention in the form of a netting tubular member or netting sleeve.

FIG. 2 illustrates, for example, a crash protection structural component according to the invention in the form of a cylindrical open ended hollow body 1 which may be referred to as a netting tubular sleeve. The netting sleeve comprises a fiber compound material strand 10 which has been wound in several layers in the manner of a conventional roving winding, however, without an effective pitch degree so that an open netting with a stationary or constant pattern is formed having a plurality of junctions 15 where the strand layers overlap and intersect one another.

Figure 4:
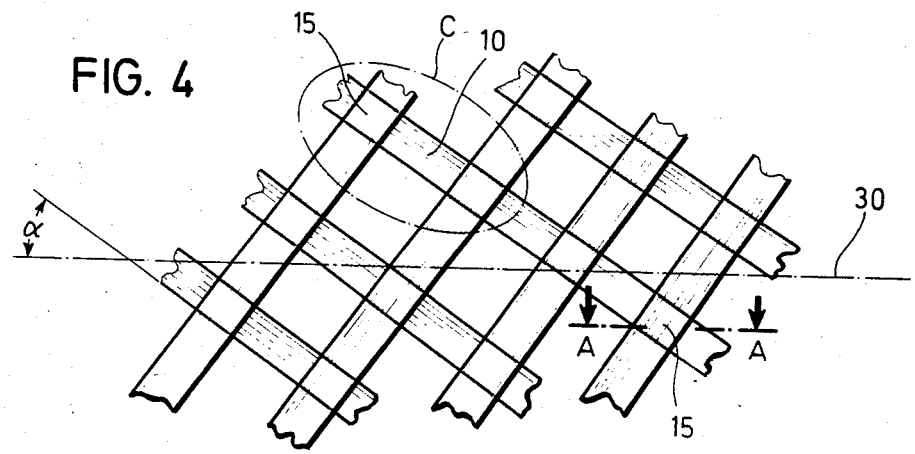
FIG. 4 shows on an enlarged scale a surface portion of a component according to the invention.

Referring also to FIG. 4 the hollow sleeve body has a longitudinal axis 30 and the individual strands 10 extend at an angle $\alpha$ in a positive or negative direction relative to the axis 30. Thus, the strands 10 extend substantially diagonally across the longitudinal axis 30 from the lower-left to the upper-right or from the upper-left to the lower-right.

Figure 5A:
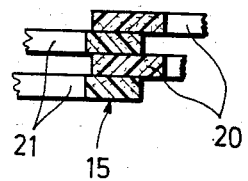
FIGS. 5A & 5B show a sectional view along section line A—A in FIG. 4, whereby FIG. 5A has a smaller number of overlapping or crossing strands than FIG. 5B.
Figure 5B:
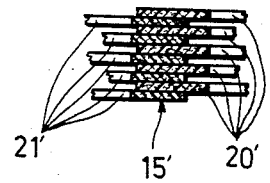

FIG. 5A illustrates a junction 15 including a total of four strands of which the strands 20 extend for example, with a positive angle $\alpha$ relative to the longitudinal axis 30, whereas the strands 21 extend with a negative angle $\alpha$. FIG. 5B is a view similar to that of FIG. 5A. However, in FIG. 5B the junction 15' is formed by a a total of ten layers of overlapping strands 20' running in one direction and further strands 21' running in the other direction. It will be noted that both sectional views in FIG. 5A and FIG. 5B illustrate junctions 15, 15' having the same overall thickness. This is accomplished by using strands which are individually thicker in FIG. 5A than in FIG. 5B. Although the use of thinner strands as shown in FIG. 5B requires a larger number of winding turns, this embodiment has the advantage that a larger number of shearing surfaces or shearing interfaces between adjacent strand layers cooperate with each other, whereby the capacity of irreversibly taking up energy is increased in the embodiment of FIG. 5B as compared to the embodiment of FIG. 5A. The just described overlapping of strands results in such a laminated, cross-over relationship of the strands, which are rigidly bonded to each other by the curing of the embedding resin, that in response to a substantially axially effective impact load, the layers forming the cross-over junctions will delaminate. Such a delamination or failure of the cross-over junctions takes up sufficient energy in a non-reversible manner to provide an effective impact damping.

Figure 6A:
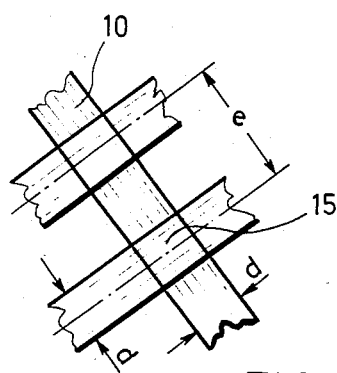
FIG. 6A illustrates the detail C enclosed by a dashed line in FIG. 4 prior to a crash impact.
Figure 6B:
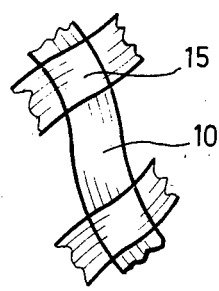
FIG. 6B is an illustration similar to FIG. 6A but after a crash impact.

FIGS. 6A and 6B illustrate an advantageous ratio between the width d of each individual strand and the spacing e between adjacent individual strands from junction to junction 15. This ratio d/e should be about 0.5. This ratio provides a substantial shearing surface area while simultaneously permitting the bending of the individual strands 10 as shown in FIG. 6B illustrating a portion of the sleeve after a crash. If the angle $\alpha$ is within the range of $\pm 30°$ to $\pm 60°$ and if the ratio d/e is approximately 0.5, the individual strands or rods 10 are short and relative to the bending moment relatively thick. Thus, these short and relatively thick bending rods are primarily exposed to bending loads while simultaneously transmitting into the junctions a substantial proportion of the shearing load. In any event, the angle of the individual strands or rods 10 is selected to assure exposing the rods or strands 10 primarily to bending loads between the junctions.

Figure 3:
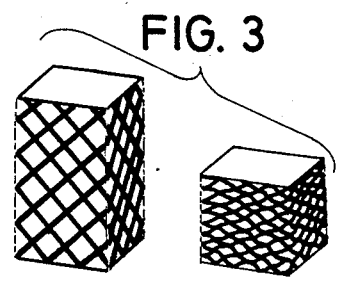
FIG. 3 shows a perspective view of a sleeve netting according to the invention having a square cross-sectional shape, whereby the left-hand part is illustrated prior to a crash impact, whereas the right-hand portion illustrates the same component after a crash impact.

FIG. 3 illustrates a sleeve of rectangular cross-section whereby the left-hand portion shows the shape of the sleeve prior to a crash, whereas the right-hand portion of FIG. 3 shows the shape of the sleeve after a crash.

Incidentally, the individual strand layers in the junctions 15 are intimately bonded to each other due to the curing of the synthetic resin material forming the matrix in which the fibers are embedded.

Figure 7:
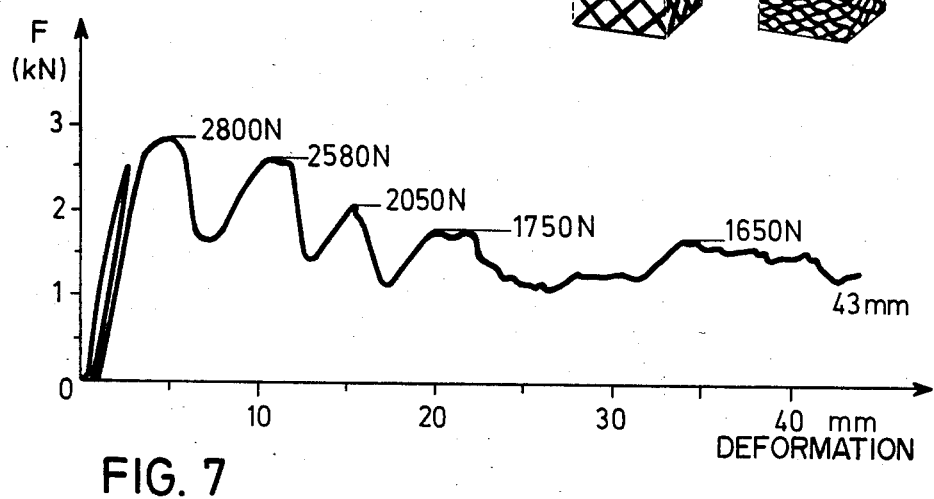
FIG. 7 is a diagrams similar to that of FIG. 1, however, showing the actual force displacement diagram of a structural component manufactured according to the invention and tested for plotting the diagram of FIG. 7.

An example embodiment of a crash protection structural component was manufactured according to the present invention with the following features:

Inner diameter: 44 mm
Length: about 150 mm
Fiber Compound Material: 800er E-Glass-Roving, impregnated with epoxy resin
Type of Netting: octad pattern without any effective pitch degree, six strand layers in each junction 15, inclination angle $\alpha$ relative to the longitudinal axis=52° strand width (d) to junction spacing e, d/e=0.5
Weight: about 35 grams The sample embodiment with the foregoing data was tested and the resulting force displacement diagram is shown in FIG. 7. The applied forces are shown in Newton. The first spike represents an elastic deformation which is immediately followed by a substantial plastic deformation resulting in an irreversible take-up of of energy illustrated by the curve representing a damping curve.

By selecting the above described number of layers in each junction 15 in combination with a proper selection of the ratio d/e and of the crossing angle $\alpha$, it is possible to construct the present component for a wide range of impact loads.

It has been found that the use of a glass roving impregnated with thermosetting epoxy resin is especially suitable for the present purposes because not only is a glass fiber roving less expensive than, for example, a carbon fiber roving, the glass fiber roving has been found to be substantially more elastic in the initial portion of the displacement following an impact in which portion an elastic deformation still takes place. Thus, a glass roving is more suitable for a reversible energy take-up than a carbon fiber roving. However, depending on the type of use intended, carbon fiber rovings may also be employed for the present invention.

In any event, it is desirable to make sure that the surface areas of the netting which are exposed to shearing loads at the junctions 15 should be as large as possible. One way of accomplishing this desired result is to increase the number of layers at each junction as shown in FIG. 5B. It will be appreciated, that the individual layers in the junctions as shown in FIGS. 5A and 5B may belong to a single long strand or they may belong to several strands. The use of several strands may be desirable if it is intended that the winding operation proceeds rapidly because by using several separate strands it is possible to wind these strands simultaneously. The larger number of strands increases the interfaces between adjacent strands and thus also increasing the shearing surfaces in which the shearing load is effective due to the alternate direction of the strand layers at a $+\alpha$ and $-\alpha$ inclination relative to the longitudinal axis 30 shown in FIG. 4.

In operation the present structural components is initially deformed in an elastic, that is, in a reversible manner, whereby the strands 10 and the junctions 15 are also exposed to shearing loads as a result of a compression load applied axially to the components. If now the shearing strength of the laminations formed by the strand layers in the junctions 15 is exceeded as the load increases, a progressive delamination takes place in the strands themselves and in the junctions. As a result of this "delamination" the component is further compressed, thereby taking up energy in a non-reversible manner, whereby the component is permanently deformed.

As mentioned, the present component is suitable in all those environments where impact or shock loads must be damped in the manufacture of motor vehicles, aircraft, and so forth.

The winding of a cylindrical sleeve onto a cylindrical winding core is especially simple. However, the invention is not limited to a cylindrical shape, as shown in FIG. 3.

Although the invention has been described with reference to specific embodiments, it will be appreciated, that it is intended, to cover all modifications and equivalents within the scope of the appended claims.

What is claimed is:

1. The new use of a crash protection structure, comprising a hollow body having a longitudinal central axis and including an open netting made of at least one fiber compound material strand having fibers embedded in a resin matrix material forming said hollow body having ends movable relative to each other in the direction of said central axis, said strands extending at an angle ($\alpha$) relative to said longitudinal axis of said structure, said angle ($\alpha$) being within the range of $\pm 30°$ to $\pm 60°$, said open netting having a plurality of strand crossing junctions (15), each strand crossing junction comprising a plurality of overlapping strand layers laminated and bonded to each other by resin matrix material in its cured state to form a rigid connection at each of said strand crossing junctions, said laminated strand layers forming interfaces between adjacent strand layers in said strand crossing junctions and taking up stress under shear, said fiber compound material strand having a width (d), said strand crossing junctions being spaced from each other by an on-center spacing (e) which is larger than said width (d) so that openings are formed in said open netting and so that strand portions between the crossing junctions form bending rods for transmitting shearing stress into said crossing junctions, as a crash protection device for taking up a stress first in an elastic manner and then in a manner irreversibly dissipating a crash force applied substantially in the direction of said longitudinal axis and moving said ends relative to each other in a substantially axial direction of said crash protection device, whereby a crash force is taken up initially in an elastic, reversible manner primarily by said bending rods, which force is then transmitted by said bending rods into said strand crossing junctions for an irreversible dissipation by the delamination of the strands in the bending rods and in the strand crossing junctions, whereby large crash force-peaks are effectively damped.

2. The new use of claim 1, of said crash protection structure, wherein each strand junction comprises about ten layers of fiber compound material forming said strand.

3. The new use of claim 1, of said crash protection structure, wherein said strand width (d) relates to said on-center spacing (e) so that (e) corresponds to about (1 to 2) times (d).

4. The new use of claim 1, of said crash protection structure, wherein said fiber compound material strand is made of a fiberglass roving impregnated with an epoxy resin.

5. The new use of claim 1, of said crash protection structure, wherein said open netting is formed by a roving winding technique without any effective pitch degree whereby said open netting has a stationary or constant pattern in which successive strands overlap each other substantially completely.

6. An elongated crash protection structure, comprising a hollow body having a longitudinal central axis made of a plurality of strands of glass fibers embedded in an epoxy resin matrix with strand crossing junctions to form an open netting, and having ends movable relative to each other in the axial direction, said strands having a strand width (d), said strand crossing junctions being spaced from each other by an on-center spacing (e) which is larger than said strand width (d) for forming openings in said open netting, said strands being wound in a pattern so that the strands extend at an angle ($\alpha$) relative to said longitudinal axis, said angle ($\alpha$) being within the range of $\pm 30°$ to $\pm 60°$, and so that said open netting has a plurality of strand crossing junctions, each strand crossing junction comprising a plurality of overlapping strand layers laminated and bonded to each other by said epoxy resin in its cured state to form a rigid connection of strand layers at each of said strand crossing junctions, said laminated strand layers forming interfaces between neighboring strands and taking up stress under shear in said strand crossing junctions, said strands also forming bending rods between the strand crossing junctions and interconnecting said strand crossing junctions, said bending rods taking up bending stress extending substantially in parallel to a plane in which said strand width (d) extends for transmitting shearing stress into said strand crossing junctions, whereby a crash force moving said ends relative to each other in a substantially axial direction is taken up initially in an elastic, reversible manner primarily by said bending rods, which crash force is then transmitted by said bending rods into said strand crossing junctions for an irreversible dissipation by the delamination of the strands inthe bending rods and in the strand crossing junctions, whereby large crash force peaks are effectively damped.

7. The crash protection structure of claim 6, wherein each strand crossing junction comprises about 10 layers of glass fiber compound material forming said strands.

8. The crash protection structure of claim 6, wherein said strand width (d) relates to said on-center spacing (e) so that (e) corresponds to about (1 to 2) times (d).

9. The crash protection structure of claim 6, wherein said open netting is formed by a roving winding technique without any effective pitch degree, whereby said open netting has a stationary or constant pattern in which successive strands overlap each other substantially completely.

10. The crash protection structure of claim 6, wherein said strands are flat strands having two flat sides with said width (d) and two narrow sides interconnecting said flat sides, said flat strands being so arranged in said open netting that bending stress is introduced into said narrow sides.

* * * * *